(12) United States Patent
MacNeil et al.

(10) Patent No.: US 8,191,972 B2
(45) Date of Patent: Jun. 5, 2012

(54) HYDRODEMOLITION MACHINE FOR INCLINED SURFACES

(75) Inventors: Gerard MacNeil, Surrey (CA); David MacNeil, Langley (CA); Gordon MacNeil, Delta (CA); Vernon Bose, Langley (CA)

(73) Assignee: Mac & Mac Hydrodemolition Inc., Surrey (CA)

( * ) Notice: Subject to any disclaimer, the term of this patent is extended or adjusted under 35 U.S.C. 154(b) by 1069 days.

(21) Appl. No.: 10/973,281

(22) Filed: Oct. 27, 2004

(65) Prior Publication Data

US 2006/0087168 A1 Apr. 27, 2006

(51) Int. Cl.
*B28D 1/00* (2006.01)

(52) U.S. Cl. .......................................................... 299/17

(58) Field of Classification Search ................ 299/17, 299/36.1, 16; 239/172, 251, 159
See application file for complete search history.

(56) References Cited

U.S. PATENT DOCUMENTS

| | | | | |
|---|---|---|---|---|
| 3,809,318 A * | 5/1974 | Yamamoto | ................... | 239/273 |
| 3,857,516 A * | 12/1974 | Taylor et al. | ................... | 239/752 |
| 4,045,086 A * | 8/1977 | Parkes et al. | ................... | 299/17 |
| 4,074,858 A | 2/1978 | Burns et al. | | |
| 4,081,200 A * | 3/1978 | Cheung | .......................... | 299/17 |
| 4,111,490 A * | 9/1978 | Liesveld | ......................... | 299/17 |
| 4,795,217 A * | 1/1989 | Hilaris | ............................. | 299/17 |
| 4,854,770 A * | 8/1989 | Puchala et al. | ................... | 299/17 |
| 5,010,694 A * | 4/1991 | Agbede | ........................... | 451/38 |
| 5,255,959 A | 10/1993 | Loegel | | |
| 5,765,924 A * | 6/1998 | Liesveld | ......................... | 299/17 |
| 6,179,519 B1 * | 1/2001 | Hilmersson | .................... | 404/91 |
| 6,877,930 B2 * | 4/2005 | Stromdahl et al. | .............. | 299/17 |
| 2005/0077775 A1 * | 4/2005 | Nakakuro | ....................... | 299/17 |

\* cited by examiner

*Primary Examiner* — John Kreck

(57) ABSTRACT

In accordance with the invention, there is provided a concrete removing apparatus for removing concrete from an inclined wall of concrete having a frame with a front region. The frame may be supported on either a platform or from the wall with the front region adjacent to the wall. A carriage assembly is coupled to the frame assembly proximate a front region thereof, the carriage assembly extending from one side of the frame to another. A nozzle assembly is mounted on the carriage assembly and operative to move laterally of the frame assembly in response to activation of the carriage assembly. A nozzle on the nozzle assembly is operative to emit a jet of fluid against the wall of sufficient velocity to remove concrete from the wall. A transporting assembly is coupled to and operative to raise and lower the carriage assembly.

2 Claims, 7 Drawing Sheets

HYDRODEMOLITION MACHINE FOR INCLINED SURFACES

FIELD OF THE INVENTION

The present invention relates to a machine and a method of hydrodemolition for removing concrete from inclined surfaces.

BACKGROUND OF THE INVENTION

In many applications, where there is a need to remove existing concrete from vertical or inclined surfaces, particularly at elevated heights, it is necessary to attempt the removal manually with jackhammrers. However, many concrete encased installations may not be compromised by the microcracks such as those imparted by the severe mechanical impacts of a jackhammer. Hydrodemolition with high-pressure water jets would be ideal if there were a way of building a robot that could traverse the vertical or inclined surfaces. Attempts have been made to construct a vertical track over which a carriage supporting a nozzle with a high-pressure water jet travels. To speed up removal, two nozzles emitting water jets traveling together side-by-side across the carriage and back again were used. One problem that developed was the fact that less concrete is removed at the extreme of travel at either end because the second jet does not overlap the path of the first at each such end. This means that the periphery on each side will be stepped. This step must be removed manually.

Another problem arises from the thickness of the wall. Typically, nuclear reactor concrete housings have a thickness of the order of 4 feet. A system must be in place that allows the nozzles to travel up to 4 feet perpendicular to the track in order to remove the entire wall thickness of material. In addition, to prevent the nozzle housing, which is larger in diameter than the nozzle, from contacting the edge of the opening, a shorter lateral distance of travel would be required for each pass or each of a set of passes. The net effect would be a side edge that stepped towards the interior of the opening with increasing depth.

Accordingly, it is an object of the invention to provide a hydrodemolition machine having water jet assemblies that removes concrete material from an inclined concrete wall at a faster rate than known methods and devices.

It is a further object of the invention to provide a hydrodemolition machine with water jet assemblies that can create an opening in a thick concrete wall that is vertical or inclined without steps in the sides of the opening.

SUMMARY OF THE INVENTION

In accordance with the invention, there is provided an apparatus for removing concrete from an inclined wall of concrete, having a frame with a front region adjacent to the wall and supported from one of the wall and a platform. The apparatus also has an elongated carriage assembly coupled to the frame proximate a front region thereof, the elongated carriage assembly extending across the frame. A nozzle assembly is mounted on the carriage assembly and is operative to move along the carriage assembly. A nozzle driving assembly is coupled to the nozzle assembly and drives the nozzle assembly along the carriage assembly. A nozzle on the nozzle assembly is operative to emit a jet of water of sufficient velocity against the wall to remove concrete from the wall. A transporting assembly is coupled to and operative to move the elongated carriage assembly along the front region.

In accordance with the invention, there is provided a concrete removal apparatus having a frame assembly with a bottom and front region, the bottom region supportable on a platform with the front region adjacent to a wall. A carriage assembly is coupled to the frame assembly proximate a front region thereof, the carriage assembly extending from one side of the frame to another. A nozzle assembly is mounted on the carriage assembly and is operative to move laterally of the frame assembly in response to activation of the nozzle driving assembly. A nozzle on the nozzle assembly is operative to emit a jet of fluid against the wall of sufficient velocity to remove concrete from the wall. A transporting assembly is coupled to and operative to raise and lower the guide and carriage assembly.

The front region is preferably rectangular and flat.

The nozzle assembly may advantageously be adjustable back and forth along its axis.

The nozzle assembly is mounted on a nozzle block that is rotatable about an axis parallel to a plane of the front region.

The carriage assembly includes an elongated guide bar that passes slidably through the nozzle block and is rigidly mounted on either end to end assemblies and a nozzle block motor and an elongated threaded rod driven by the nozzle block motor, the rod threadedly engaging the nozzle block and the nozzle block operative to move along the guide bar in response to rotation of the rod.

The transporting assembly may include a transport motor mounted to the frame and having a rotatable shaft and a pair of lifting mechanisms coupled to the transport motor and to respective ends of the guide and operative to raise and lower the carriage assemblies.

A pair of spaced apart nozzle assemblies may be mounted on the carriage assembly and be operative to move laterally of the frame assembly in response to activation of the nozzle driving assembly. The nozzle assemblies move across respective halves of the frame assembly. A nozzle on each of the nozzle assemblies is operative to emit a jet of fluid against the wall of sufficient velocity to remove concrete material from the wall. A transporting assembly may be coupled to and operative to raise and lower the carriage assembly.

Rather than a pair, there may be a plurality of spaced apart nozzle assemblies mounted on the carriage assembly with the nozzle assemblies aligned along a direction perpendicular to the carriage assembly, and operative to move laterally of the frame assembly in response to activation of the nozzle assembly drivers, with the nozzle assemblies moving across respective halves of the frame assembly.

DESCRIPTION OF THE PREFERRED EMBODIMENT

Figure 1:
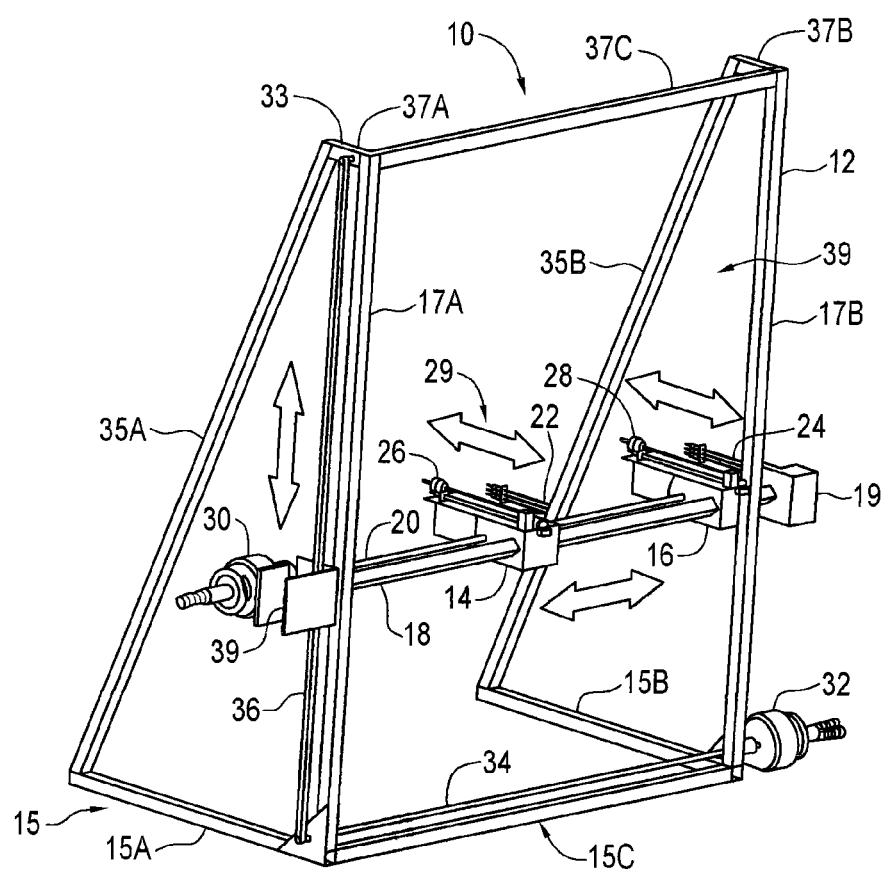
FIG. 1 is a perspective view of the hydrodemolition machine with its moveable carriage and two water jet assemblies.

Referring to FIG. 1, for the sake of simplicity, the hydrodemolition machine 10 is shown without hydraulic, air and electric lines, water lines, various frame elements and various other parts. Hydrodemolition machine 10 has a frame 12 with a base 15 made up of base elements 15A, 15B and 15C and vertical supports 17A and 17B, which together with elements 37C and 15C define a front region 39 of frame 12. Inclined elements 35A and 35B, together with respective base elements 15A and 15B and vertical supports 17A and 17B, form a generally triangular shape on either side of the frame 12. Short members 37A and 37B at the top of the structure join elements 35A and 17A and 35B and 17B, respectively.

A carriage assembly 29 consists of guide bar 18 extending from one side of frame 12 to the other and is mounted at one end in a block 19 which, in turn, can be slid vertically with respect to frame 12. At the other end guide bar 18 is mounted to a plate 39, which also slides vertically with respect to frame 12. Nozzle blocks 14 and 16 are each slidably mounted on guide bar 18. An elongated threaded lead screw 20 engages threaded bores in each of nozzle blocks 14 and 16 and is journaled in block 19 and one end and is driven by an actuator 30 at another end. Nozzle blocks 14 and 16 are spaced apart a distance of approximately one-half the spacing of vertical supports 17A and 17B. Mounted on top of nozzle blocks 14 and 16 are nozzle jet assemblies 22 and 24, respectively. Hydraulic actuators 26 and 28 are affixed to nozzle blocks 14 and 16, respectively, and powered hydraulically, electrically or by air, drive nozzle jet assemblies 22 and 24, respectively, along the length of respective nozzle blocks 14 and 16. Carriage assembly 29 is supported at either end by a chain 36, which loops around a sprocket rotatably driven by shaft 34 and actuator 32. Operation of actuator 32 causes carriage assembly 29 to be raised and/or lowered.

Figure 2:
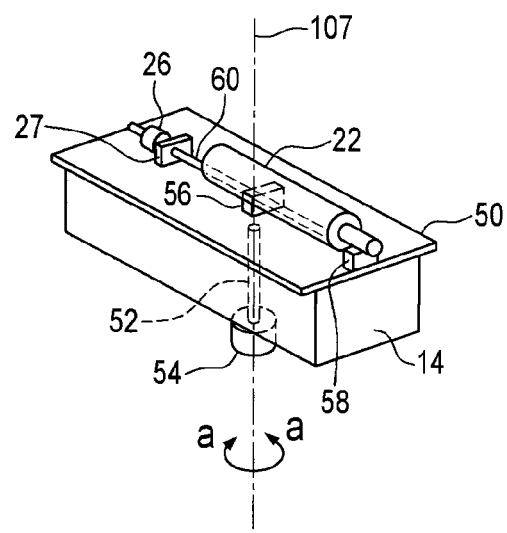
FIG. 2 is a perspective view of the nozzle assembly for a single nozzle.

Nozzle block 14 has a plate 50 rotatably attached as shown in FIG. 2 by means of a shaft 52 passing through a center of nozzle block 14 and being affixed to an underside of plate 50. Actuator 54 and shaft 52 can rotate plate 50 through a desired angle about axis 107-which is parallel to a plane of the wall and perpendicular to the carriage assembly-in either direction as shown by the double arrow a-a. A second actuator 26 is mounted on top of plate 50 having a threaded shaft 60 rotating in actuator blocks 27 and 58. Actuator blocks 27 and 58 are rigidly affixed to plate 50. A drive plate 56, affixed to a nozzle jet assembly 22, threadedly engages threaded shaft 60 anc, in response to rotation of the latter, causes drive plate 56 and, hence, nozzle jet assembly 22 to move parallel to an axis of threaded shaft 60. A similar arrangement exists for nozzle jet assembly 24 (see FIG. 1).

Figure 3:
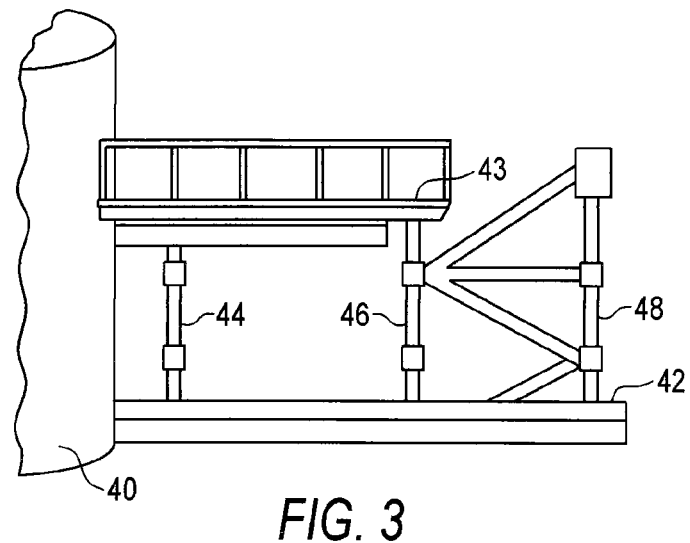
FIG. 3 is a side elevation view of a platform elevated from ground level used to support workers and equipment.

One important application of the hydrodemolition machine 10 is to open a hole in a side of a nuclear reactor concrete wall 40 so that components such as a steam generator (not shown) inside may be replaced. As shown in FIG. 3, the first task is to set up a platform 43 immediately below the proposed opening. The platform 43 is supported by a number of steel elements 44, 46, and 48. A debris catcher 42 is spread out beneath the platform 43 so that it is positioned to catch the concrete debris falling from the platform during operation.

Figure 4:
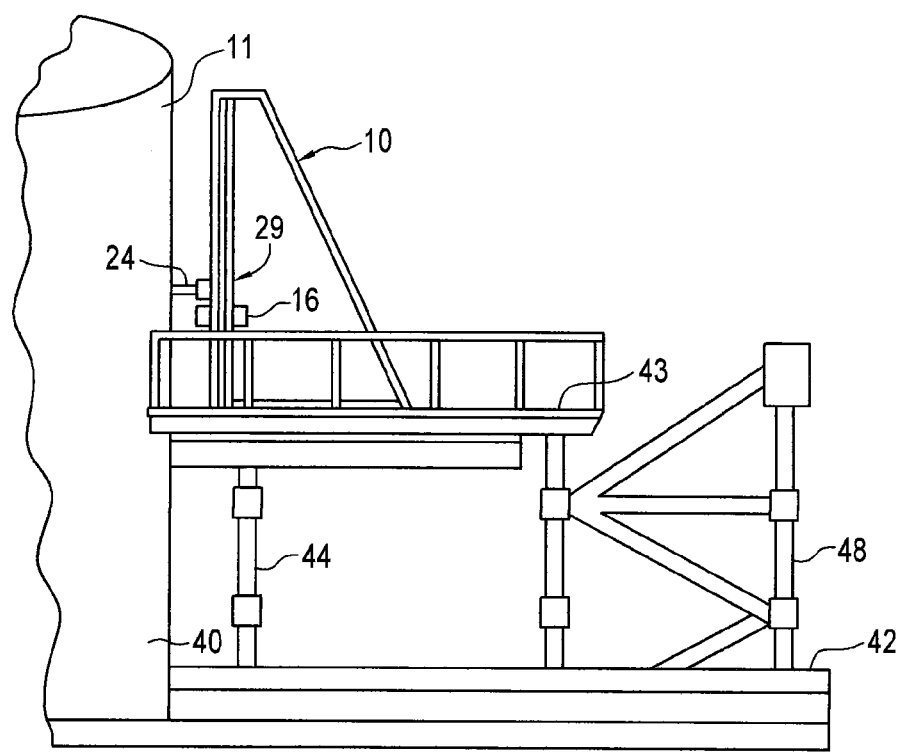
FIG. 4 is a side elevation view of the platform of FIG. 3 supporting the hydrodemolition machine of FIG. 1.

As seen in FIG. 4, the hydrodemolition machine 10 is placed on the platform 43 with a crane and positioned so that it is lined up to begin concrete removal. The carriage assembly 29 is lowered to the bottom of frame 12 (see FIG. 1) and hydraulic actuators 26 and 28 (see FIG. 1) are operated to position the nozzle assemblies the right distance from the wall 11. Actuator 54 (see FIG. 2) adjusts the angle of the nozzle jet assembly 22 and a similar adjustment is made for nozzle jet assembly 24. The water leading to the nozzle jet assemblies is then turned on. At the same time, actuator 30 (see. FIG. 1) begins to move the nozzle blocks 14 and 16 sideways. Initially, only the region around the center of the frame is cut by the water jets as the end regions are too far away. As the concrete in the center region is removed, the hydraulic actuators 26 and 28 (see FIG. 1) are moved outwardly towards the wall to keep the distance between the end of the nozzles and the wall constant. With each pass, the actuators are moved outwardly until the whole area planned for removal has been cut. An azimuthal adjustment provided by actuator 54 and a like actuator mcunted on carriage block 16 allows the nozzle jet assemblies to rotate and remove the same width of concrete without moving across the frame the same distance as in the first few passes. This allows the opening of a hole with a square edge.

Operationally, the nozzle jet assemblies 22 and 24 move across half the width of the frame 12, after which actuator 32 moves the carriage assembly 29 incrementally, and the nozzle jet assemblies 22 and 24 return. This process is repeated until the carriage assembly 29 has moved from the bottom all the way to the top of the frame 12. The carriage assembly 29 could also move from the top to the bottom of frame 12.

Figure 5:
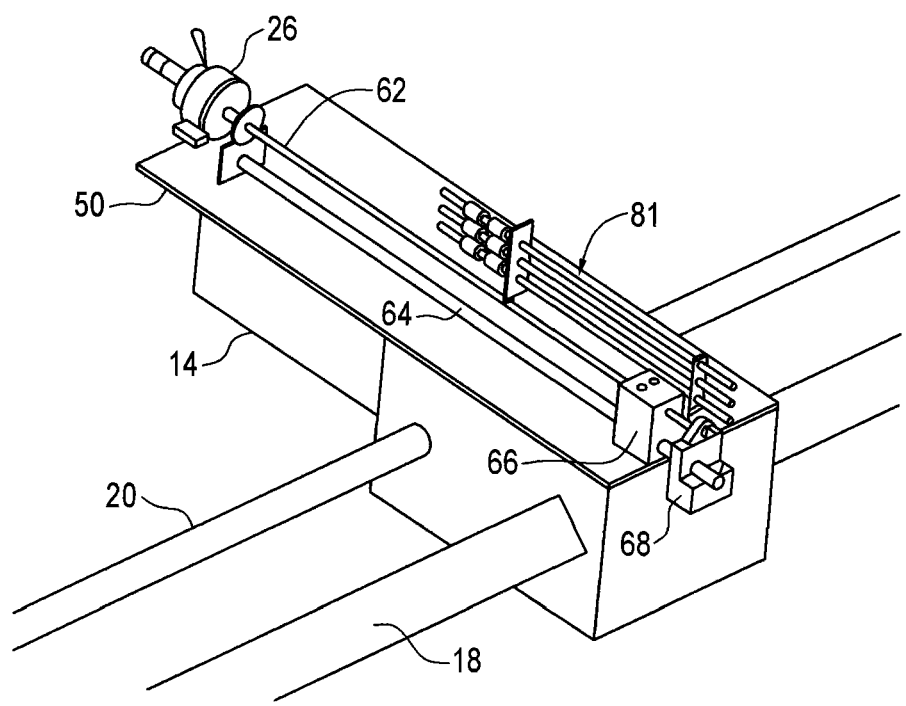
FIG. 5 is a perspective view of a nozzle assembly having three vertically spaced apart nozzles.
Figure 6:
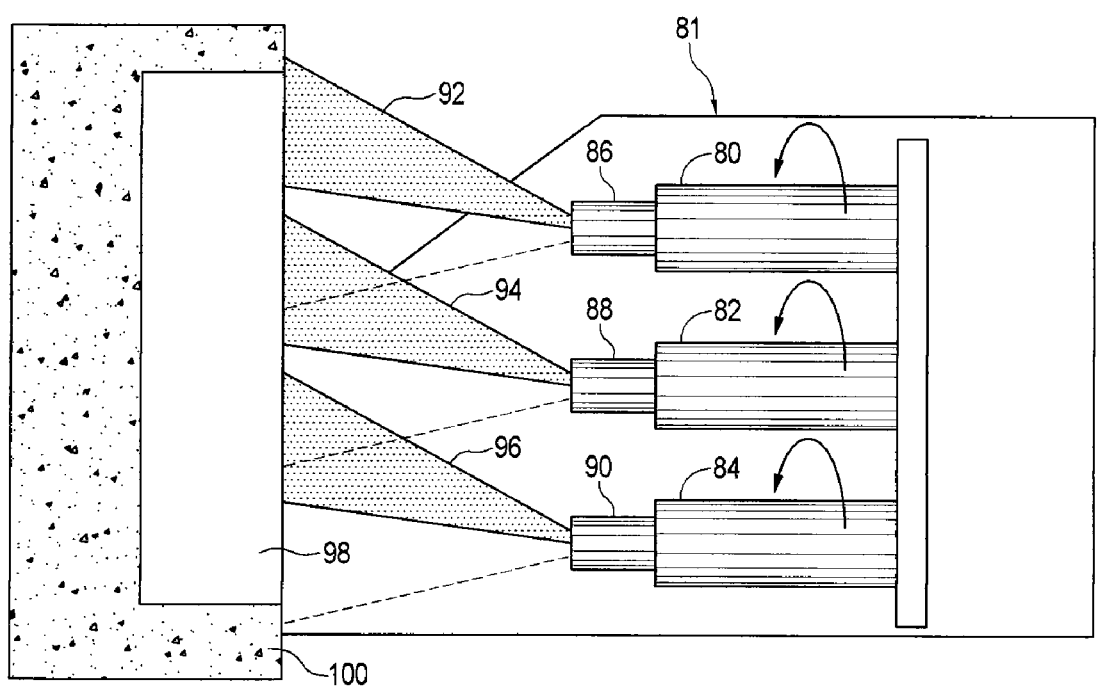
FIG. 6 is a top sectional view of the nozzle assembly with three nozzles blasting a concrete wall having reinforcing rod.

Optionally, the single nozzle shown in FIG. 2 can be replaced by a nozzle assembly 81 having three vertically spaced apart nozzles as shown in FIGS. 5 and 6. Referring to FIG. 5, in this case, hydraulic actuator 26 couples to a lead screw 62 that is threadedly received by block 66. A guide bar 64 slidably passes through block 66 and is fastened to nozzle block 14 by bracket 68.

Referring to FIG. 6, in order to maximize the area of the swath 98 of removed concrete, it is advantageous to rotate or oscillate the nozzles 86, 88, and 90 about an axis that is at a slight angle to that of the nozzle housings 80, 82 and 84, causing the nozzles 86, 88 and 90 to wobble and the jets to cover a wider area as shown in FIG. 6. The foregoing mounting arrangement also has the advantage of reducing the impact of the jets on the wall 100. In FIG. 6, the divergence of the jets of water 92, 94 and 96 have been exaggerated to demonstrate the averaging effect of the three jets when rotating or oscillating.

Figure 7:
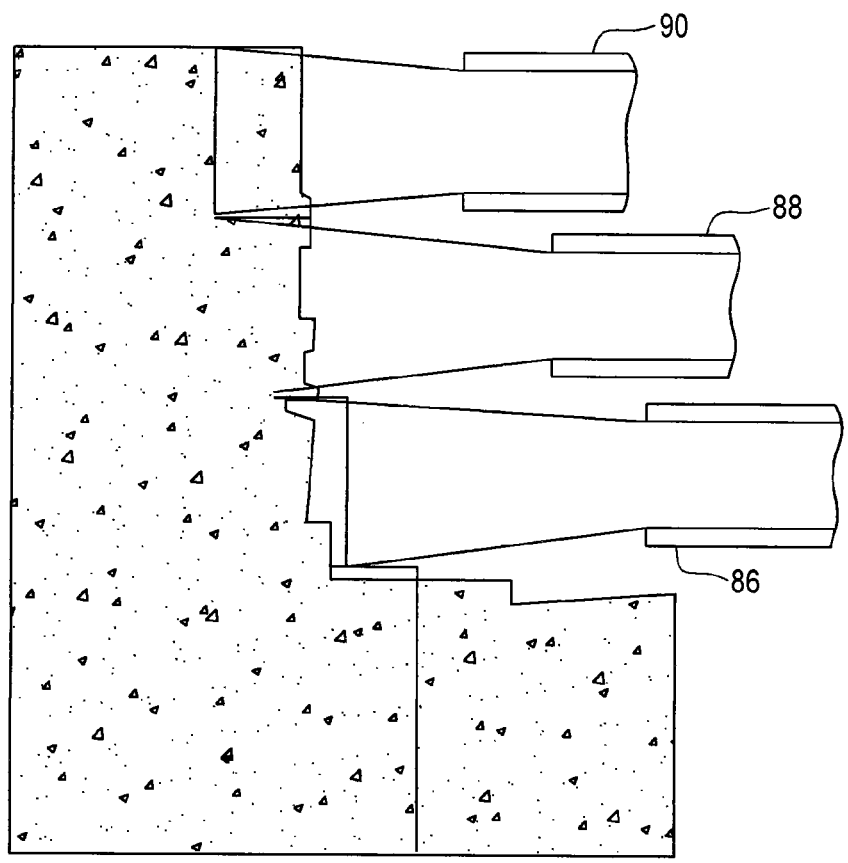
FIG. 7 is a schematic top view of a section of a wall within the swath of the top nozzle.

Referring to FIG. 7, with three nozzles, in the event of indexing of the carriage assembly 29 in incremental movements equal to the spacing between adjacent nozzles and in the direction of the arrow, it is necessary to be able to adjust the distance of each nozzle from the wall separately. This is necessary because the amount of concrete removed before impact by the nozzle 90 will be greater than that removed before impact by the nozzle 86. However, staggering the distance of each nozzle from the wall does require starting the nozzle 90 first for the first pass, the middle nozzle 88 second for its first pass and finally the lowest nozzle 86 third for its first pass. To accomplish the foregoing, it is necessary to be able to adjust the distance from the wall for each nozzle independently. It is possible to have all three nozzles the same distance from the wall and to index the carriage assembly 29 so that the lowest nozzle is positioned just above the previous position for the nozzle 90.

Figure 8:
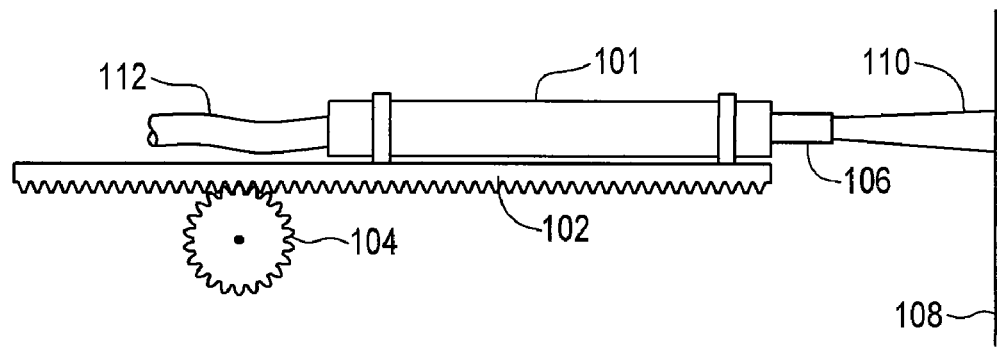
FIG. 8 is a side elevation view of a nozzle assembly mounted on a rack and pinion gear system.

Mounting each nozzle on a rack and pinion gear system as shown in FIG. 8 allows a large distance of adjustment perpendicular to the plane of the front of region 39. In FIG. 8, the exchanger and flow control valve assembly 101 are mounted to a rack gear 102 in a position in which the nozzle 106, received at a distal end of the exchanger and flow control valve assembly 101, is directed outwardly towards a wall 108. Nozzle 106, during operation, emits a jet 110. At the opposite end of the nozzle is a hose 112, which brings pressurized water to the flow control valve assembly 101. A pinion gear 104 has circumferential teeth, which engage the teeth of the rack gear 102. The pinion gear 104 is coupled to a hydraulic actuator (not shown). Rotation of the pinion gear 104 causes the rack gear 102 to move linearly depending on the direction of rotation of the pinion gear 104. The exchanger and flow control valve assembly 101 controls the flow to the nozzle 106 and also causes the nozzle 106 to rotate.

Rather than using a chain drive to drive either end of the carriage assembly 29 up and down as shown by the arrow with two points in FIG. 1, one could also use a rack and pinion gear set on either side of frame 12.

There are other designs possible such as an elongated rail extending from one vertical support 17A to another vertical support 17B. The nozzle assemblies could each consist of a block with wheels, which engage and roll along the rail. A rack could extend along the rail on the back side from one end to the other. A motor mounted on the block could drive a pinion gear engaging the rack gear, thereby, moving the block along the rail. The nozzle and nozzle position adjustor are mounted on the block.

Although two nozzle assemblies each covering half of the length of the carriage and moving in synchrony have been described. However, obviously the nozzles could move independently along the carriage. Additionally, more than two nozzles assemblies could be used.

The carriage and frame element could be curved to conform with the curvature of the concrete wall. This would offer a slight advantage at the start of hydrodemolition since the whole length of the frame could be used to remove concrete.

While the operation of the hydrodemolition machine 10 has been described as moving the carriage assembly 29 either down to up or up to down, obviously, the hydrodemolition machine could be designed to move from right to left or from left to right with the carriage assembly 29 extending substantially vertically.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. An apparatus for removing concrete from a wall, said apparatus comprising:
    a) a frame assembly having a bottom region and a front region, said front region positioned adjacent the wall;
    b) a carriage assembly coupled to said frame assembly proximate said front region and adjacent the wall, said carriage assembly extending from a first side of said frame assembly to a second side of said frame assembly;
    c) at least one nozzle assembly comprising:
        (i) at least one nozzle operative to emit a jet of water against the wall with sufficient velocity to remove concrete from the wall;
        (ii) a nozzle block rotatable about a first axis, the first axis being parallel to the plane of said front region and perpendicular to said carriage assembly, wherein said nozzle is mounted on said nozzle block;
        (iii) a first nozzle actuator operative to position said nozzle a selected distance from the wall; and
        (iv) a second nozzle actuator operative to rotate said nozzle block about the first axis, whereby the rotation of said nozzle block causes said nozzle to direct the jet of water toward a side of an opening in the wall;
    d) a nozzle assembly driving means for driving said nozzle assembly back and forth along said carriage assembly;
    e) a transporting assembly operative to raise and lower said carriage assembly along said front region of said frame assembly; and
    f) a platform or deck, wherein said bottom region is supported on said platform or deck.

2. An apparatus for removing concrete from a wall, said apparatus comprising:
    a) a frame assembly comprising:
        i) a bottom region;
        ii) a first vertical support; and
        iii) a second vertical support, wherein said first vertical support and said second vertical support define a front region of said frame assembly, the front region being positioned adjacent the wall;
    b) a carriage assembly extending from said first vertical support to said second vertical support;
    c) at least one nozzle assembly mounted on said carriage assembly and operative to move along said carriage assembly between said first vertical support and said second vertical support, said nozzle assembly comprising:
        i) at least one nozzle, said nozzle adapted to emit a jet of fluid against the wall with sufficient velocity to remove concrete from the wall, wherein said nozzle is rotatable about a first axis that is substantially parallel to a plane of said front region and substantially perpendicular to said carriage assembly;
        ii) at least one first nozzle actuator operative to position said nozzle a selected distance from the wall; and
        iii) at least one second nozzle actuator operative to rotate said nozzle about the first axis, whereby the jet of fluid emitted by said rotated nozzle is directed toward a side of an opening in the wall;
    d) at least one nozzle assembly driver means for moving said nozzle assembly back and forth along said carriage assembly;
    e) a transporting assembly means for raising and lowering said carriage assembly along said front region of said frame; and
    f) wherein said bottom region is supported by a deck or platform.

* * * * *